United States Patent
Krah

(10) Patent No.: US 9,467,069 B2
(45) Date of Patent: Oct. 11, 2016

(54) FEED-IN/FEEDBACK CONVERTER WITH PHASE CURRENT TRANSFORM

(71) Applicant: Beckhoff Automation GmbH, Verl (DE)

(72) Inventor: Jens Onno Krah, Wuppertal (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 111 days.

(21) Appl. No.: 14/463,936

(22) Filed: Aug. 20, 2014

(65) Prior Publication Data

US 2014/0355318 A1 Dec. 4, 2014

Related U.S. Application Data

(63) Continuation of application No. PCT/EP2013/052076, filed on Feb. 1, 2013.

(30) Foreign Application Priority Data

Mar. 1, 2012 (DE) .................. 10 2012 203 204

(51) Int. Cl.
*H02M 7/538* (2007.01)
*H02M 7/5387* (2007.01)
*H02M 7/539* (2006.01)
*H02M 7/219* (2006.01)
*H02M 1/00* (2006.01)
*H02M 1/084* (2006.01)

(52) U.S. Cl.
CPC ......... *H02M 7/53871* (2013.01); *H02M 1/084* (2013.01); *H02M 7/219* (2013.01); *H02M 7/539* (2013.01); *H02M 2001/0003* (2013.01); *H02M 2001/0025* (2013.01); *H02M 2007/53876* (2013.01); *H02M 2007/53878* (2013.01)

(58) Field of Classification Search
CPC ............. H02M 7/53871; H02M 2007/53876; H02M 2007/53878
See application file for complete search history.

(56) References Cited

U.S. PATENT DOCUMENTS

| 5,585,708 | A | 12/1996 | Richardson et al. |
| 6,038,152 | A | 3/2000 | Baker |
| 7,075,264 | B2 * | 7/2006 | Huggett ................ 318/363 |

(Continued)

FOREIGN PATENT DOCUMENTS

AT 395664 B 2/1993

OTHER PUBLICATIONS

A. Riccobono and E. Santi, "Positive Feed-Forward control of three-phase voltage source inverter for DC input bus stabilization," Applied Power Electronics Conference and Exposition (APEC), 2011 Twenty-Sixth Annual IEEE, Fort Worth, TX, 2011, pp. 741-748.*

(Continued)

*Primary Examiner* — Fred E Finch, III
*Assistant Examiner* — Peter Novak
(74) *Attorney, Agent, or Firm* — Dorsey & Whitney LLP

(57) ABSTRACT

A method of controlling a frequency converter comprises steps for measuring phase currents flowing in a three-phase supply network, for generating a first modulation space vector that comprises an angle that is synchronous to a supply voltage of the three-phase supply network and a determined modulation index as an amplitude, for generating a third modulation space vector depending on the first modulation space vector and the measured phase currents and for modulating the frequency converter according to the third modulation space vector.

7 Claims, 9 Drawing Sheets

(56) References Cited

U.S. PATENT DOCUMENTS 8,902,616 B2 * 12/2014 Royak .................... H02M 1/32
363/37
2005/0207192 A1 9/2005 Fu et al.

OTHER PUBLICATIONS

Malinowski, "Sensorless Control Strategies for Three—Phase PWM Rectifiers", Ph.D. Thesis, Warsaw University of Technology, Faculty of Electrical Engineering, Institute of Control and Industrial Electronics, 2001 Polan. (128 pages).

Marschalko et al., "Optimal Control and Appropriate Pulse Width Modulation for a Three-Phase Voltage dc-link PWM Converter", Proceedings of the industry application society annual meeting, 1992. (8 pages).

Rizqiawan et al., "Impact of Double-Loop Controller on Grid Connected Inverter Input Admittance using Virtual Resistor", IEEE Applied Power Electonices Colloquium (IAPEC) 2011, pp. 170-175. (6 pages).

* cited by examiner

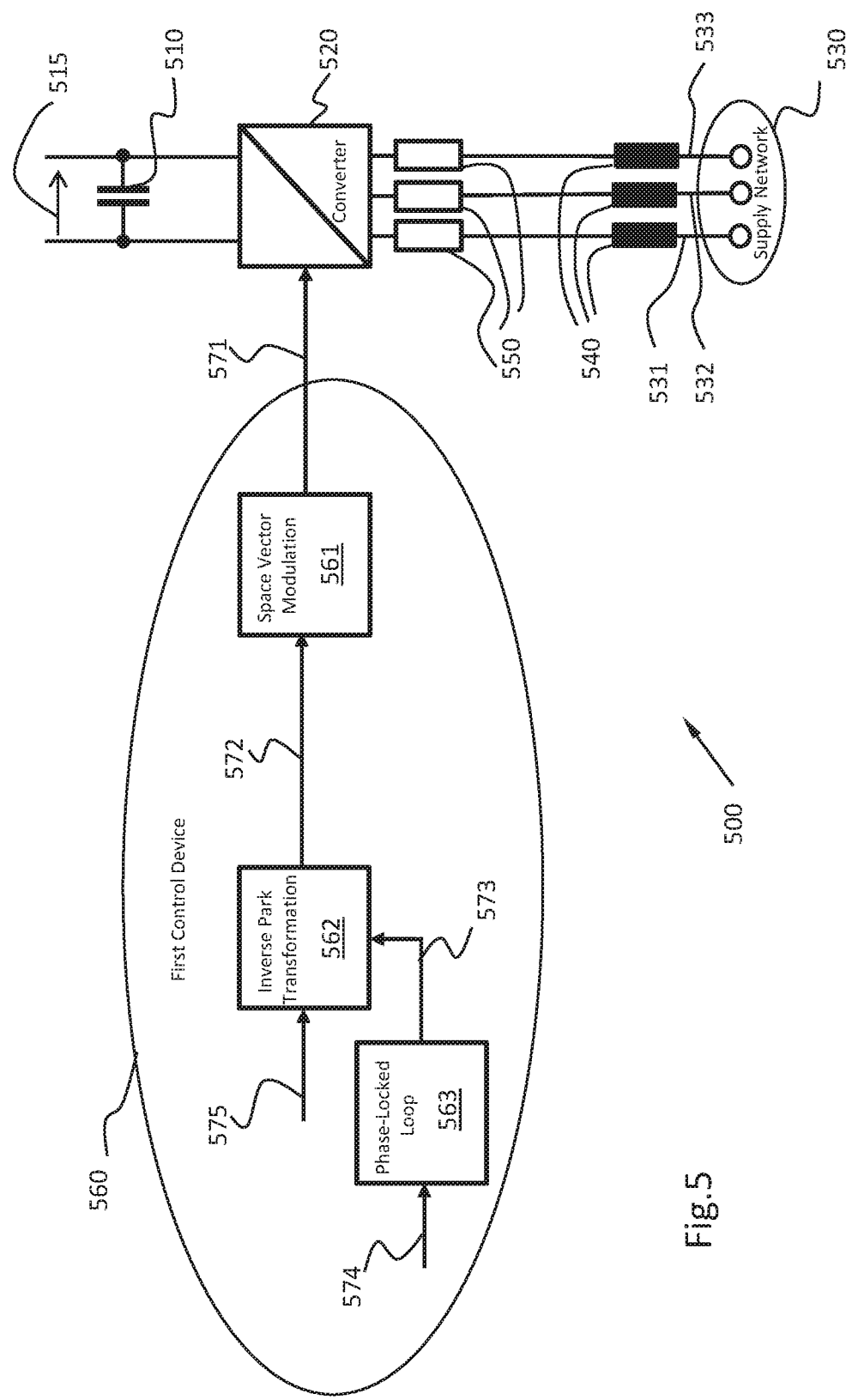

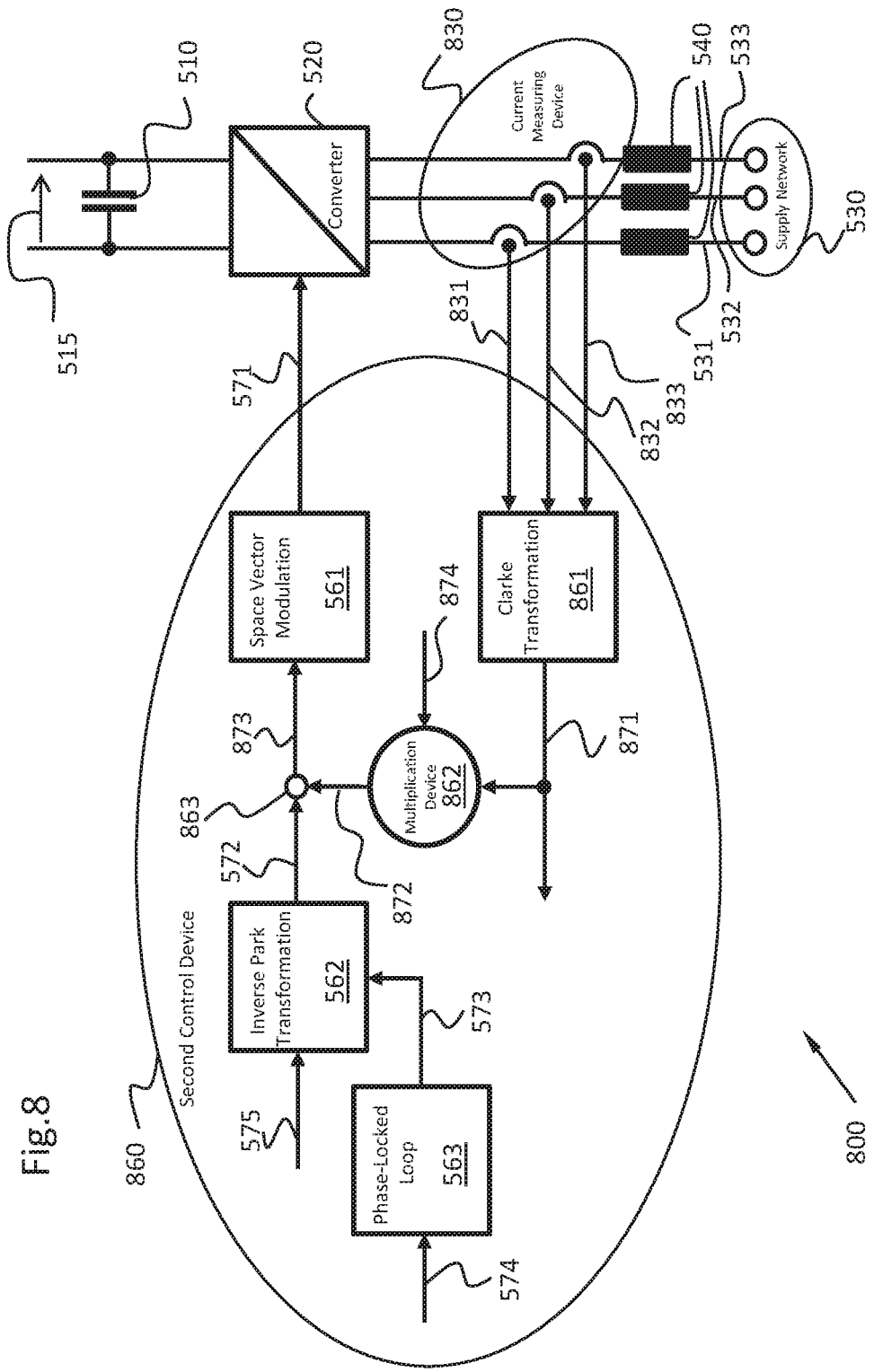

US 9,467,069 B2

FEED-IN/FEEDBACK CONVERTER WITH PHASE CURRENT TRANSFORM

CROSS-REFERENCE TO RELATED APPLICATIONS

This application is a continuation of International Patent Application No. PCT/EP2013/052076, filed on Feb. 1, 2013, which claims priority to German Patent Application No. DE 10 2012 203 204.5, filed on Mar. 1, 2012, the entire contents of both of which are incorporated herein by reference.

BACKGROUND

This disclosure relates generally to frequency conversion. In particular, the disclosure relates to methods for controlling frequency converters, and related circuit arrangements.

SUMMARY

The present invention refers to a method for controlling a frequency converter as well as to a circuit arrangement for generating an intermediate circuit voltage from a supply voltage of a three-phase supply network.

It is an object of the present invention to specify an improved method for controlling a frequency converter. This object is solved by a method of controlling a frequency converter having features of the claims. It is a further object of the present invention to provide an improved circuit arrangement for generating an intermediate circuit voltage from a supply voltage of a three-phase supply network. This object is solved by a circuit arrangement having features of the claims. Preferred embodiments are specified in the dependent claims.

A method of controlling a frequency converter comprises steps for measuring phase currents flowing in phase conductors of a three-phase supply network, for generating a third modulation space vector which comprises an angle that is synchronous to a supply voltage of the three-phase supply network, and an amplitude that depends on a determined modulation index and the measured phase currents, and for modulating the frequency converter according to the third modulation space vector. For generating the third modulation space vector, steps for generating a first modulation space vector that comprises the angle that is synchronous to the supply voltage of the three-phase supply network and the determined modulation index as an amplitude are carried out, and steps for generating the third modulation space vector depending on the first modulation space vector and on the measured phase currents. For generating the third modulation space vector, steps are carried out for implementing a Clarke transformation in order to transform the measured phase currents into a second current space vector, steps for multiplying the second current space vector by a determined virtual resistance to obtain a second modulation space vector, and for subtracting the second modulation space vector from the first modulation space vector to obtain the third modulation space vector.

A circuit arrangement for generating an intermediate circuit voltage from a supply voltage of a three-phase supply network comprises an intermediate circuit capacitor that may be connected to a first phase conductor, a second phase conductor and a third phase conductor of a three-phase supply network via a frequency converter and smoothing inductors, a measuring device for measuring phase currents flowing in the phase conductors and a control device that is provided for controlling the frequency converter. The control device is configured to generate a third modulation space vector that comprises an angle that is synchronous to a supply voltage of the three-phase supply network, and an amplitude that is dependent on a determined modulation index and on the measured phase currents, and is configured to modulate the frequency converter according to the third modulation space vector. The control device is configured to generate a first modulation space vector for generating the third modulation space vector, the first modulation space vector comprising the angle that is synchronous to the supply voltage of the three-phase supply network and the determined modulation index as an amplitude and the control device is configured to generate the third modulation space vector dependent on the first modulation space vector and on the measured phase currents. For generating the third modulation space vector, the control device is configured to transform the measured phase currents into a second current space vector via a Clarke transformation, to multiply the second current space vector by a determined virtual resistance to obtain a second modulation space vector, and to subtract the second modulation space vector from the first modulation space vector to obtain the third modulation space vector.

BRIEF DESCRIPTION OF THE DRAWINGS

In the following, the invention will be explained in more detail on the basis of drawings in which:

FIG. 5 depicts a block diagram of a first feed-in/feedback converter having a lossy internal resistor;

FIG. 8 depicts a block diagram of a second feed-in/feedback converter having a virtual internal resistor;

DETAILED DESCRIPTION

With reference to FIGS. 1 to 4, the mode of operation of a virtual internal resistor is first of all explained on the basis of a two-quadrant chopper. A two-quadrant chopper is an electronic circuit that may be understood as a combination of a step-up chopper and a step-down chopper. In a two-quadrant chopper, energy may flow from a source to an appliance and from the appliance to the source.

Figure 1:
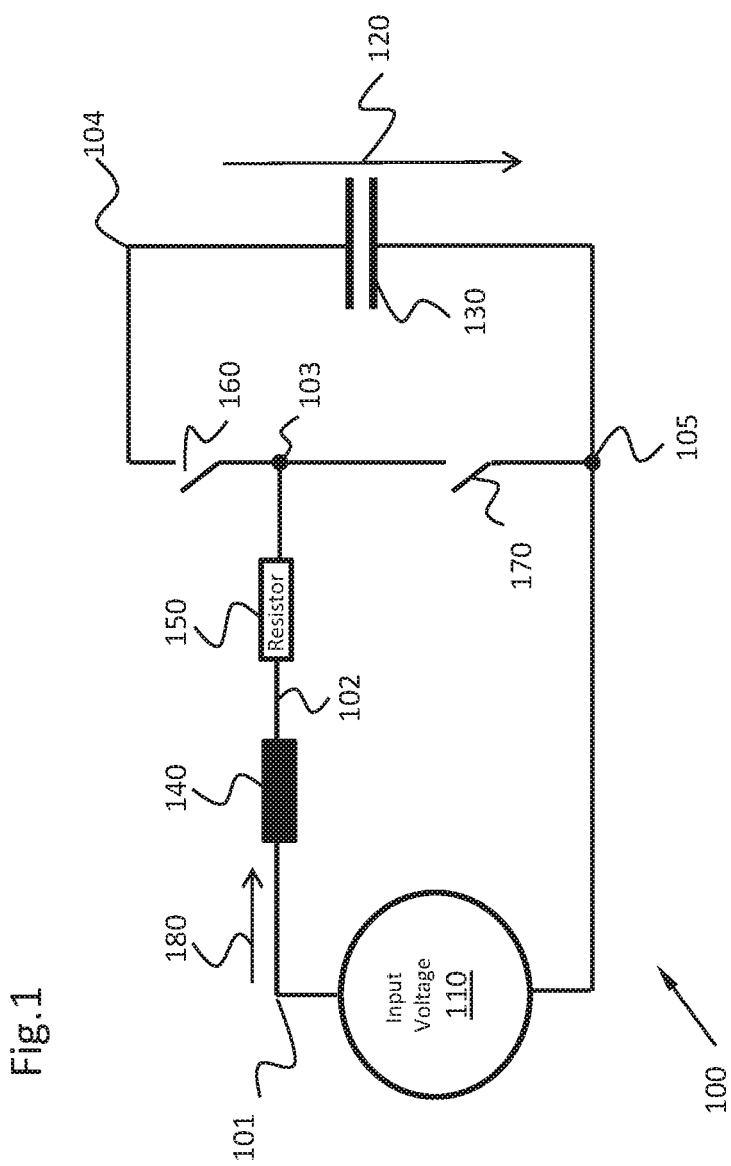
FIG. 1 shows a circuit arrangement of a first two-quadrant chopper for explaining the mode of operation of a virtual internal resistor.

FIG. 1 shows a circuit arrangement of a first two-quadrant chopper 100. The circuit arrangement comprises a first node 101, a second node 102, a third node 103, a fourth node 104 and a fifth node 105. An input voltage 110 may be applied between the first node 101 and the fifth node 105. A capacitor 130 is arranged between the fourth node 104 and the fifth node 105, an output voltage 120 dropping over the capacitor 130. An inductor 140 is arranged between the first node 101 and the second node 102. A real, i.e. a lossy, resistor 150 is arranged between the second node 102 and the third node 103. A first switch 160 is arranged between the third node 103 and the fourth node 104. The first switch 160 might e.g. be configured as transistor. Between the third node 103 and the fifth node 105, a second switch 170 is arranged that may e.g. as well be configured as transistor switch. An electric current 180 flows through the inductor 140.

The output voltage 120 should be set to a multiple of the input voltage 110, e.g. to the 1.25-fold of the input voltage 110. For this purpose, the first switch 160 and the second switch 170 are opened and closed at a determined pulse duty factor a in an alternating manner. The inductor 140 serves as energy storage and for smoothing the current. The resistor 150 dampens the oscillatory, otherwise non-controlled system of inductor 140 and capacitor 130. If the pulse duty factor a=1/1.25=0.8, the first switch 160 is thus switched on for 80% of a cycle duration and the second switch 170 is switched on for 20% of a cycle duration, the output voltage 120 adopts the 1.25-fold value of the input voltage 110. In the case of a positive current 180 the first two-quadrant chopper 100 behaves as a step-up chopper and in the case of a negative current 180 as a step-down chopper.

Figure 2:
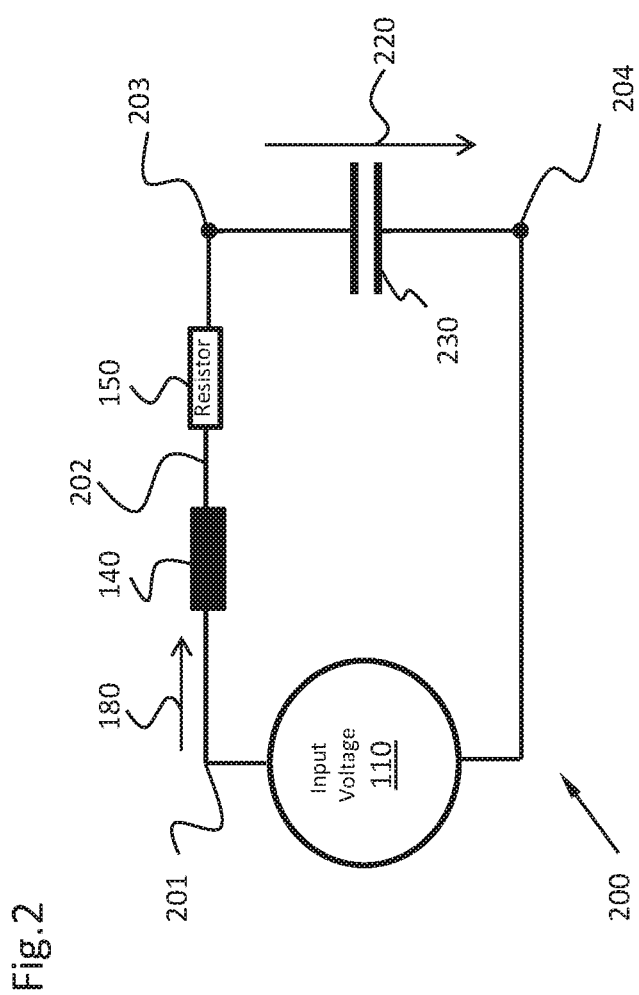
FIG. 2 depicts a first equivalent circuit diagram for the first two-quadrant chopper.

If the switch frequency at which the first switch 160 and the second switch 170 are switched is considerably higher than the resonance frequency of the RLC resonator configured of resistor 150, inductor 140 and capacitor 130, the first two-quadrant chopper 100 of FIG. 1 may be depicted as a first equivalent circuit diagram 200 shown in FIG. 2.

The first equivalent circuit diagram 200 comprises a first node 201, a second node 202, a third node 203 and a fourth node 204. The input voltage 110 is applied between the first node 201 and the fourth node 204. The inductor 140 is arranged between the first node 201 and the second node 202, the current 180 flowing through the inductor 140. The resistor 150 is arranged between the second node 202 and the third node 203. An equivalent capacitor 230 is arranged between the third node 203 and the fourth node 204, an equivalent capacitor voltage 220 dropping over the equivalent capacitor 230.

The equivalent capacitor 230 comprises a capacity corresponding the capacity of the capacitor 130 of the first two-quadrant chopper 100 divided by the square of the pulse duty factor a. The equivalent capacitor voltage 220 dropping over the equivalent capacitor 230 corresponds to the product of the output voltage 120 of the first two-quadrant chopper 100 and the pulse duty factor a. The efficient capacity of the equivalent capacitor 230 is thus a function of the pulse duty factor.

Figure 3:
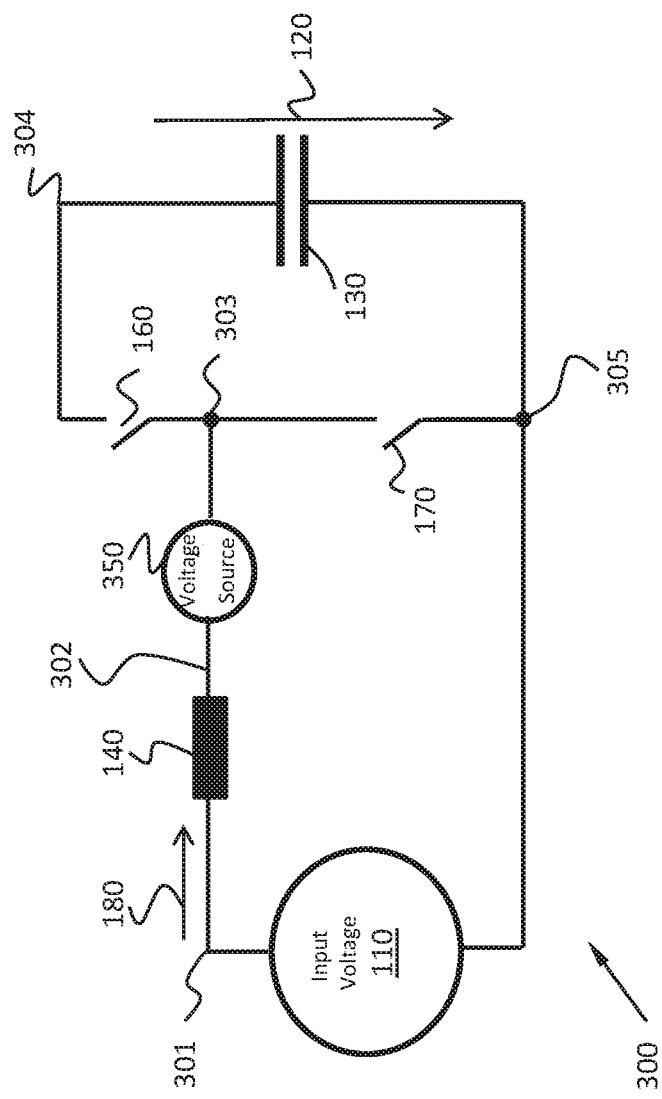
FIG. 3 shows a circuit arrangement of a second two-quadrant chopper without a lossy Resistor.

FIG. 3 shows a circuit arrangement of a second two-quadrant chopper 300. The circuit arrangement comprises a first node 301, a second node 302, a third node 303, a fourth node 304 and a fifth node 305. The input voltage 110 is applied between the first node 301 and the fifth node 305. The capacitor 130 is arranged between the fourth node 304 and the fifth node 305. The output voltage 120 in turn drops over the capacitor 130. The inductor 140 is arranged between the first node 301 and the second node 302, the current 180 flowing through the inductor 140. The first switch 160 is arranged between the first node 303 and the fourth node 304. The second switch 170 is arranged between the third node 303 and the fifth node 305.

Instead of the lossy resistor 150, the second two-quadrant chopper 300 comprises a controlled voltage source 350 between the second node 302 and the third node 303. The controlled voltage source 350 applies a voltage u(t) between the second node 302 and the third node 303 depending on the current 180 flowing through the inductor 140. In this manner, a virtual resistance $R_v$ and a virtual inductance $L_v$ may be programed:

$$u(t) = R_v \cdot i(t) + L_v \cdot \frac{d}{dt}i(t). \quad [1]$$

Here, i(t) indicates the value of the current 180 that is dependent on the time t.

The virtual resistance $R_v$ and the virtual inductance $L_v$ have the advantage that no loss of energy incurs at them.

Figure 4:
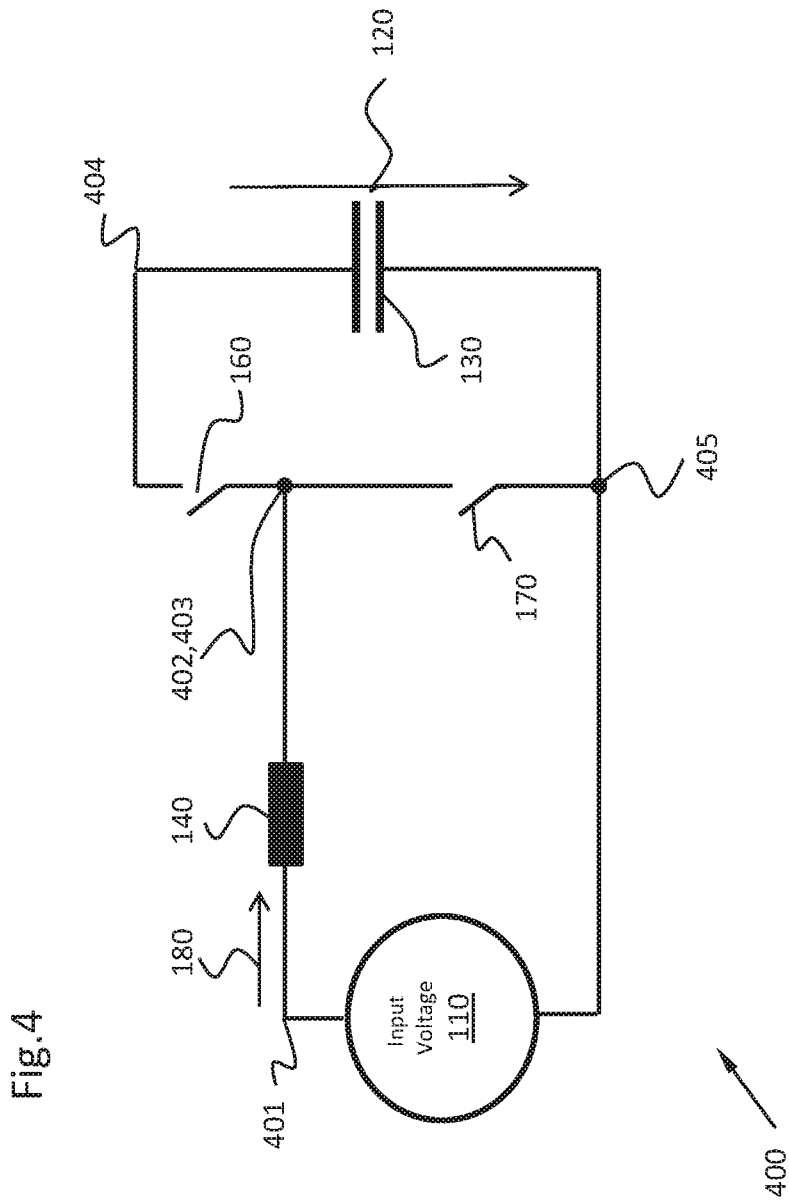
FIG. 4 shows a circuit arrangement of a third two-quadrant chopper for explaining a virtual internal resistor.

FIG. 4 shows a circuit arrangement of a third two-quadrant chopper 400. The circuit arrangement comprises a first node 401, a second node 402, a third node 403, a fourth node 404 and a fifth node 405. However, in the circuit arrangement of the third two-quadrant chopper 400, the second node 402 and the third node 403 are one. The input voltage 110 is applied between the first node 401 and the fifth node 405. The output voltage 120 drops over the capacitor 130 which is arranged between the fourth node 404 and the fifth node 405. The inductor 140 is arranged between the first node 401 and the second node 402, the current 180 flowing through the inductor 140. The first switch 160 is arranged between the third node 403 and the fourth node 404. The second switch 170 is arranged between the third node 403 and the fifth node 405. Both the resistor 150 and the controlled voltage source 350 are omitted in the third two-quadrant chopper 400.

Instead, in the third two-quadrant chopper 400, the pulse duty factor a with which the first switch 160 and the second switch 170 are opened and closed in an alternating manner is modified as a function of the current 180. For that purpose, the pulse duty factor a is chosen as $$a(t) = 0,8 + i(t) \cdot \frac{R_v}{u_{dc}}, \quad [2]$$

in order to achieve the behaviour of a virtual resistance $R_v$. Here, i(t) is in turn the current 180 that is dependent on the time t. The yielding value of the output voltage 120 is indicated by $u_{dc}$.

The behaviour of a virtual inductance $L_v$ might be achieved by a supplemental additive term:

$$L_v \cdot \frac{1}{u_{dc}} \cdot \frac{d}{dt}i(t). \quad [3]$$

For example a value $R_v$=5 Ω (ohm) may be chosen as virtual internal resistance.

The damping ratio $\xi$ is $$\xi = \frac{R_v}{2}\sqrt{\frac{C}{L}}. \quad [4]$$

Here, C is the (calculated) capacity of the capacitor 230 and L the inductance of the inductor 140.

For a minimum damping, the maximum inductance $L_{max}$ is $$L_{max} = \frac{R_v^2 \cdot C}{4\xi^2}. \qquad [5]$$

If the serial resonator of the third two-quadrant chopper is not sufficiently damped, the damping ratio ξ may be increased by an additional negative virtual inductance $L_v$. The RLC system of the third two-quadrant chopper is stable as long as the virtual resistance $R_v$ is positive. A virtual inductance $L_v$ may be negative however, the sum $L+L_v$ should be higher than 0 in order to guarantee the stability.

In the case of a capacity of the capacitor 230 of 2000 µF and a virtual resistance $R_v$=5 ohm, a maximum inductance $L_{max}$ of 25 mH yields at a desired minimum damping ratio ξ of 0.707. The minimally-required inductance $L_{min}$ for smoothing the current significantly yields from the allowed current ripple and the chosen switch frequency with which the switches 160, 170 are switched.

In the following, the principle explained on the basis of FIGS. 1 to 4 is widened for a use in a three-phase supply network.

FIG. 5 shows a block diagram of a first feed-in/feedback converter 500. The first feed-in/feedback converter 500 comprises a direct voltage intermediate circuit having an intermediate circuit capacitor 510, an intermediate voltage 515 being applied over the intermediate circuit capacitor 510. The intermediate circuit capacitor 510 is connected to a first phase 531, a second phase 532 and a third phase 533 of a three-phase supply network 530 via a frequency converter 520, three resistors 550 and three smoothing inductors 540. The frequency converter 520 may e.g. be a three-level converter having a good efficiency. The first feed-in/feedback converter 500 comprises real, lossy resistors 550 for damping and for limiting the current.

The first feed-in/feedback converter 500 comprises a first control device 560 for controlling the frequency converter 520. The first control device 560 may be configured as an analog circuit. Preferably, the first control device 560 is however implemented digitally.

The first control device 560 comprises a phase-locked loop 563 providing an angle 573 that is synchronous to the voltage of the first phase 531 of the three-phase supply network 530. For this purpose, the phase-locked loop 563 is provided with an angle deviation 574. The phase-locked loop 563 controls the angle 573 in such a way that the angle deviation 574 is minimized.

In the first control device 560, a modulation index 575 is furthermore determined. The modulation index 575 and the angle 573 are provided to a device for an inverse Park transformation 562. The device for the inverse Park transformation 562 generates a rotating first modulation space vector 572. The first modulation space vector 572 comprises the angle 573 and a constant amplitude predetermined by the modulation index 575.

The first modulation space vector 572 is provided to a device for space vector modulation 561 which generates control signals 571 therefrom with which the frequency converter 520 of the first feed-in/feedback converter 500 is controlled.

If the angle 573 provided by the phase-locked loop 563 is synchronous to the voltage of the first phase 531 of the three-phase supply network 530, a supply output voltage of the frequency converter 520 approximately corresponds to the supply voltage. A remaining difference in voltage causes a flow of current which adjusts according to the resistors 550 and the inductors 540.

Figure 6:
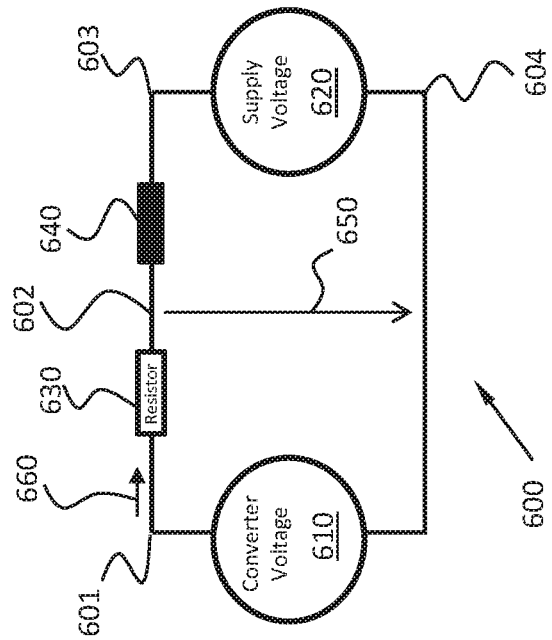
FIG. 6 depicts a one-phase second equivalent circuit diagram for explaining a network basic oscillation.

For explaining the behaviour of absolute value and phase, FIG. 6 depicts a one-phase second equivalent circuit diagram 600 for the network basic oscillation of 50 Hz. The second equivalent circuit diagram 600 comprises a first node 601, a second node 602, a third node 603 and a fourth node 604. A converter voltage 610 is applied between the first node 601 and the fourth node 604. A supply voltage 620 is applied between the third node 603 and the fourth node 604. A resistor 630 is arranged between the first node 601 and the second node 602, a current 660 flowing through the resistor 630. An inductor 640 is arranged between the second node 602 and the third node 603. Between the second node 602 and the fourth node 604, a voltage 650 is applied, the value of which is the difference between the converter voltage 610 and the product of the value of the current 660 and the resistance value of the resistor 630. The current 660 flows then when the supply voltage 620 and the converter voltage 610 differ in phase or in amplitude.

Figure 7:
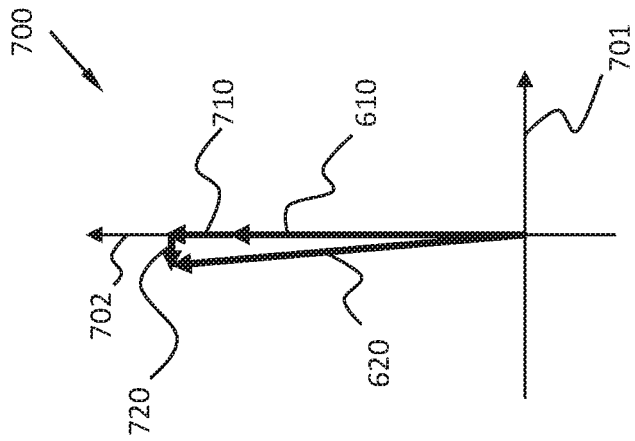
FIG. 7 shows a one-phase vector diagram for explaining the behaviour of amount/amplitude and phase of voltage and current.

FIG. 7 shows a vector diagram 700 having a reactive axis 701 and an active axis 702. The absolute values and phases of the converter voltage 610, the supply voltage 620, the voltage 710 dropping over the resistor 630 and the voltage 720 dropping over the inductor 640 are shown.

FIG. 8 shows a schematic block diagram of a second feed-in/feedback converter 800. The second feed-in/feedback converter 800 is a widening of the first feed-in/feedback converter 500 of FIG. 5. The second feed-in/feedback converter 800 also comprises an intermediate circuit having an intermediate circuit capacitor 510, an intermediate circuit voltage 515 being applied at the intermediate circuit capacitor 510. The intermediate circuit capacitor 510 is connected to the first phase 531, the second phase 532 and the third phase 533 of the three-phase supply network 530 via a frequency converter 520. In turn, smoothing inductors 530 are provided between the phases 531, 532, 533 of the three-phase supply network 530. The real, lossy resistors 550 of the first feed-in/feedback converter 500 of FIG. 5 are, however, emitted are replaced by a virtual resistor as will be explained in the following.

Instead of the first control device 560 of the first feed-in/feedback converter 500, the second feed-in/feedback converter 800 comprises a second control device 860. The second control device 860 may be configured as an analog circuit. Preferably, however, the second control device 860 is implemented in a digital manner.

The second control device 860 comprises a phase-locked loop 563, an angle deviation 574 being provided to the phase-locked loop 563 and the phase-locked loop 563 outputting an angle 573 which is synchronous to the voltage of the first phase 531 of the three-phase supply network 530. A device for an inverse Park transformation 652 again generates a first modulation space vector 572 having the angle 573 and an amplitude that is determined by a modulation index 575.

The second feed-in/feedback converter 800 comprises a current measuring device 830 provided to measure a phase current 831 flowing in the first phase 531 of the three-phase supply network 530, a second phase current 832 flowing in the second phase 532 and a third phase current 833 flowing in the third phase 533.

The measured current values 831, 832, 833 are transferred to a device for a Clarke transformation 861 comprised by the second control device 860. The device for the Clarke transformation 861 transforms the three-phase phase current 831, 832, 833 into a two-axis second current space vector 871.

A first multiplication device 862 comprised by the second control device 860 multiplies the second current space vector 871 by a determined virtual resistor 874 to obtain a second modulation space vector 872. The second modulation space vector 872 is subsequently subtracted from the first modulation space vector 872 by a subtraction device 863 to obtain a third modulation space vector 873. Thereby, when having a sufficiently-high switching frequency of the converter, a behaviour that dynamically corresponds to the behaviour of real resistors is achieved. However, the virtual resistor 874 is advantageously not lossy.

The third modulation space vector 873 is provided to a device for space vector modulation 561 which generates control signals form the third modulation space vector 873, the frequency converter 520 of the second feed-in/feedback converter 800 being controlled by means of said control signals 571.

The power circuit of the second feed-in/feedback converter 800 consisting of the intermediate circuit capacitor 510, the frequency converter 520 and the smoothing inductors 540 corresponds to the power circuit of a conventional feed-in/feedback converter. However, for controlling the frequency converter 520, the virtual resistor 874 and the modulation index 575 are modulated instead of using a cascaded control. Preferably, the frequency converter is a IGBT inverted rectifier. The use of a three-level converter is particularly preferred.

Figure 9:
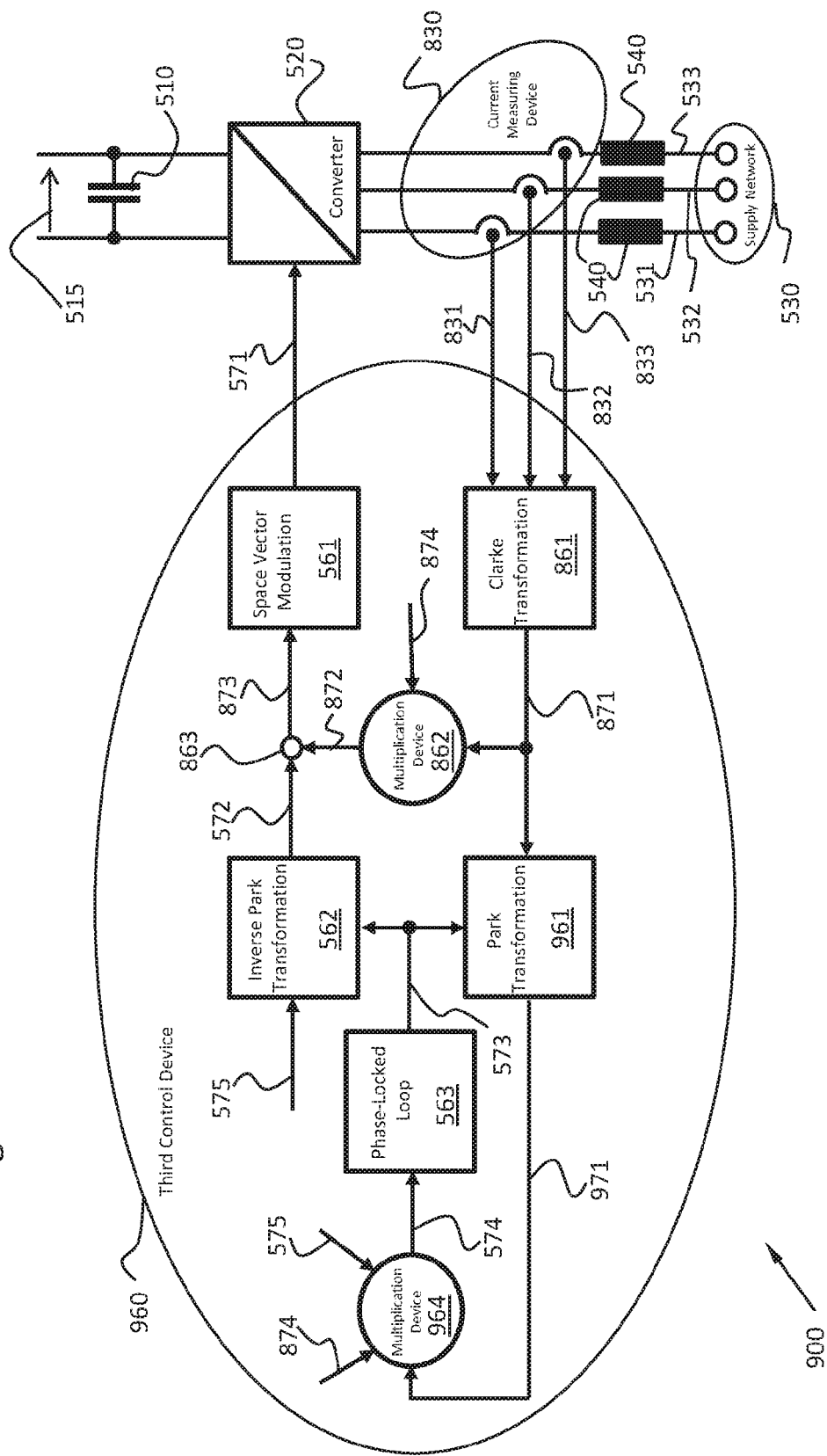
FIG. 9 shows a block diagram of a third feed-in/feedback converter having a virtual internal resistor and a closed phase-locked loop.

FIG. 9 shows a block diagram of a third feed-in/feedback converter 900. The third feed-in/feedback converter 900 is a further widening of the second feed-in/feedback converter 800 of FIG. 8 and of the first feed-in/feedback converter 500 of FIG. 5.

The third feed-in/feedback converter 900 again comprises an intermediate circuit having intermediate circuit converter 510 over which an intermediate circuit voltage 515 drops. The intermediate circuit capacitor 510 is connected to a first phase 531, a second phase 532 and a third phase 533 of a three-phase supply network 530 via a frequency converter 520, preferably an IGBT inverted rectifier.

A current-measuring device 830 is provided to measure current value of a first phase current 831 flowing in the first phase 531, of a second phase current 832 flowing in the second phase 532 and of a third phase current 533 flowing through a third phase 833.

The third feed-in/feedback converter 900 comprises a third control device 960 instead of the second control device 860 of the second feed-in/feedback converter 800. The third control device 960 can in turn be configured as an analog circuit. However, it is preferably implemented in a digital manner.

A phase-locked loop 563 of the third control device 960 receives an angle deviation 574 and generates an angle 573 that is synchronous to the voltage of the first phase 531 of the three-phase supply network. A device for an inverse Park transformation 562 generates a first modulation space vector 572 having the angle 573 and an amplitude that is determined by a determined modulation index 575.

A device for a Clarke transformation 861 of the third control device 960 transforms the three-component phase current strength 831, 832, 833 into a two-component second current space vector 871. A first multiplication device 862 multiplies the second current space vector 871 by a determined virtual resistor 874 to obtain a second modulation space vector 872. A subtraction device 863 subtracts the second modulation space vector 872 from the first modulation space vector 572 to obtain a third modulation space vector 873. A device for space vector modulation 561 generates control signals 571 from the third modulation space vector 873 by means of which the frequency converter 520 is controlled. Together with the intermediate circuit voltage, the supply output voltage of the frequency converter 520 yields.

In contrast to the second control device 860 of the second feed-in/feedback converter 800, the third control device 960 of the third feed-in/feedback converter 900 additionally comprises a device for a Park transformation 961 that transforms the three-component measured phase current 831, 832, 833 into a two-component first current space vector 971. Mathematically, it is alternatively possible to gain the first current space vector 971 from the second current space vector 871 gained by the device for a Clarke transformation 861, which is why the device for a Park transformation 961 is depicted as subsequent to the device for a Clarke transformation 861 in the block diagram of FIG. 9.

The first current space vector 971 comprises an active component and a reactive component. The active component is frequently marked by an index d (direct axis) and the reactive component by an index q (quadrature axis). The request posed to the phase-locked loop 563 to adjust the angle 573 in such a way that the angle 573 is synchronous to the first phase 531 of the three-phase supply network 530 corresponds to the request that the reactive component of the first current space vector 971 vanishes, i.e. that it is adjusted to zero. If this is the case, the first modulation space vector 572 and the phase current 831, 832, 833 are in phase. Optionally, a phase shift differing from zero might, however, also be provided.

In order to set the reactive component of the first current space vector 971 to zero, said reactive component is multiplied by a quotient of the determined virtual resistor 874 and the determined modulation index 575 by a second multiplication device 964 of the second control device 960 in order to attain the angle deviation 574. Said angle deviation 574 is provided to the phase-locked loop 563. Thus, the phase-locked loop in the third control device 960 of the third feed-in/feedback converter 900 is closed.

The third feed-in/feedback converter 900 can be initialized with a pre-charge circuit at the beginning of operation, as is obvious to a person skilled in the art and is not shown here in detail.

In the third feed-in/feedback converter 900, an active current or voltage control in the intermediate circuit is not required. Instead, the intermediate circuit voltage 515 adjusts in a non-controlled manner depending on the voltage of the three-phase supply network 530 and a load current in the intermediate circuit. The desired behaviour may therein be adjusted by parameterization of the virtual resistor 874 and the modulation index 575. This is in the following explained on the basis of FIG. 10.

Figure 10:
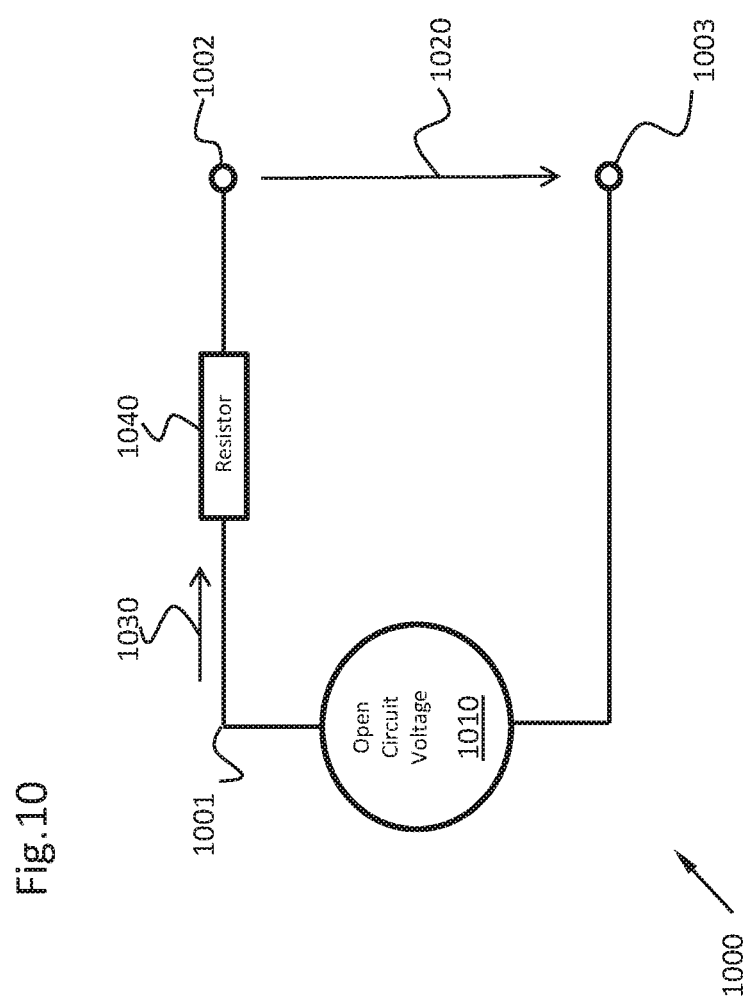
FIG. 10 depicts a schematic circuit arrangement for explaining the advantages of the third feed-in/feedback converter.

FIG. 10 shows a schematic depiction of an intermediate circuit 1000. The circuit comprises a first node 1001, a second node 1002 and a third node 1003.

Between the first node 1001 and the third node 1003, an open-circuit voltage 1010 is applied that corresponds to the modulation index 575 of the third feed-in/feedback converter 900. Said open-circuit voltage 1010 is chosen to be higher than the absolute value of the supply voltage of the three-phase supply network 530. For example, the open-circuit voltage 1010 may amount to the 1.6-fold amplitude of the supply voltage. In a three-phase supply network 530 having 400 V, the open-circuit voltage would e.g. amount to 640 V.

Between the first node 1001 and the second node 1002, a virtual resistor 1040 is arranged that corresponds to the virtual resistor 874 of the third feed-in/feedback converter 900. A load current 1030 flows through the virtual resistor 1040.

Between the second node 1002 and the third node 1003, an intermediate circuit 1020 is applied that corresponds to the intermediate circuit voltage 515 of the third feed-in/feedback converter 900.

If an exemplary value of 5 ohm is chosen for the virtual resistor 1040, the intermediate circuit voltage 1020 decreases by 5 V per Ampère according to Ohm's law. In the case of a feedback of energy, i.e. a negative load current 1030, the intermediate circuit voltage 1020 would accordingly increase proportionally to the load current 1030. Thus, the intermediate circuit voltage 1020 sets depending on the open-circuit voltage 1010 and the load current 1030.

By the choice of the values of the virtual resistor 1040, respectively the virtual resistor 874 of the third feed-in/feedback converter 900 and the open-circuit voltage 1010, respectively the modulation index 575 of the third feed-in/feedback converter 900, the compliance of the intermediate circuit voltage 1020, respectively of the third intermediate circuit voltage 515 of the third feed-in/feedback converter 900 may be set. The value of the virtual resistor 1040, 874 indicates to which extent the intermediate circuit voltage 1020, 515 decreases or increases with the load current 1030.

If the intermediate voltage 1020, 515 reaches a determined maximum value, e.g. 740 V at a load current of −20 A and a virtual resistance of 5 ohm, a load resistor that may optionally be connected may impede a further increase of the intermediate circuit voltage 1020, 515. If however, the intermediate circuit voltage 1020, 515 reaches a determined minimum value of e.g. 540 V at a load current of +20 A and a virtual resistance of 5 ohm, a diode rectifier switched in parallel without network inductance may take over the additionally-required current. The diode rectifier and the load resistor may either be provided within the third feed-in/feedback converter 900 or they may be connected in a modular manner or as individual modules.

The voltage spike of the intermediate circuit voltage 515 that is allowed in the third feed-in/feedback converter 900 advantageously makes it possible that short-term peak performances are stored in the intermediate circuit capacitor 510 or are taken from the intermediate circuit capacitor 510. If e.g. the intermediate circuit capacitor 510 comprises a capacity of 1000 μF and if an increase of the intermediate circuit voltage 515 from a value of 640 V up to a value of 740 V is allowed, an energy of 69 Ws may be stored in the intermediate circuit capacitor 510.

A further advantage of the third feed-in/feedback converter 900 is that several third feed-in/feedback converters 900 may be switched in parallel without limitation. An electric current is then divided up in load direction as well as in feedback direction according to the virtual resistors 874 of the third feed-in/feedback converter 900. This also applies for the devices of differing installation size supplied by the feed-in/feedback converter 900 if the virtual resistors 874 of the third feed-in/feedback converters 900 are respectively configured in an inversely proportional manner to the effective outputs of said devices.

The resulting total resistance yields from the parallel connection of the virtual resistors 874 of the third feed-in/feedback converters 900.

A further advantage of the third feed-in/feedback converter 900 is that individual third feed-in/feedback converters 900 may be connected or disconnected according to requirements during a running operation. This allows for operating the third feed-in/feedback converters 900 according to requirements at a respectively optimal efficiency.

A further advantage of the third feed-in/feedback converter 900 is that it does not comprise any tendency to oscillate. This also applies for their use in soft networks.

The third feed-in/feedback converter 900 may also be operated in a one-phase manner. For this purpose, only an adaption of the phase-locked loop of the third control device 960 of the third feed-in/feedback converter 900 is required which is known to a person skilled in the art.

Advantageously, the described method for controlling the frequency converter does not require an active current or voltage control. Instead, in this method, an intermediate circuit voltage is adjusted relative to a voltage of the three-phase supply voltage in a non-controlled manner. Thereby, the effort required for carrying out said method is advantageously reduced and an efficiency during operation of the frequency converter that is improved compared to the state of the art may be achieved. Also, it is advantageous that a supply output voltage of the frequency converter approximates the supply voltage of the three-phase supply network with increasing phase currents, the phase currents thus being automatically delimited.

Advantageously, the intermediate circuit voltage adjusts in a non-controlled manner relatively to the supply voltage of the three-phase supply network with a virtual resistor. Advantageously, the method allows for the intermediate circuit voltage to decrease proportionally to a load current depending on the value of the virtual resistance, or in the case of a feedback, increase, corresponding to Ohm's law. This behaviour has the advantage that when a pre-settable maximum value of the intermediate circuit voltage is reached, a load resistor that may optionally be connected may prevent a further voltage increase. Furthermore, when reaching a pre-settable maximum load current, i.e. when reaching a minimum value of the intermediate circuit voltage determined by the supply voltage, the virtual resistance and the predetermined maximum load voltage, a diode rectification without network inductance that is switched in parallel may receive the additionally-required current. A further advantage of the method is that by allowing a voltage rise in the direct current intermediate circuit, momentary peak performances may be stored in the intermediate circuit capacitor or may be taken from the same.

A particular advantage of the method is that feed-in/feedback converters with frequency converters controlled by the method may be switched in parallel in an unlimited manner. This allows for connecting and disconnecting individual modules during running operation, depending on demands, a particularly favourable efficiency in all performance situations resulting thereof.

A further advantage of said method for controlling a frequency converter is its robustness as a result of which no or only a small tendency to oscillate is developed also for soft networks.

Preferably, for generating the first modulation space vector, steps for implementing a Park transformation are carried out using the angle in order to transform the measured phase currents into a first current space vector, for controlling the angle in such a way that a reactive-current component of the first current space vector vanishes, and for generating the first modulation space vector which comprises the angle and the determined modulation index as an amplitude, by means of an inverse Park transformation. Advantageously, this is a simple possibility of generating the first modulation space vector with an angle that is synchronous to the supply voltage of the three-phase supply network.

In a variant of the method, the reactive-current component of the first current space vector is multiplied by a quotient of a determined virtual resistance and the determined modulation index to obtain an angle deviation, wherein the angle deviation is provided to a phase-locked loop for controlling the angle. Advantageously, controlling the phase-locked loop then has the result that a reactive-current component of the first current space vector always comprises a negligible value.

In an additional variant of the method, a control signal for the frequency converter is generated from the third modulation space vector by means of a space vector modulation. The supply output voltage of the frequency converter then results from the third modulation space vector and the intermediate circuit voltage. Advantageously, the frequency converter itself may then be configured in a known manner, e.g. as IGBT inverted rectifier.

Advantageously, the circuit arrangement described above does not require any active current or voltage control. Instead, in this circuit arrangement, an intermediate circuit voltage sets relatively to a voltage of the three-phase supply network in a non-controlled manner. Thereby, the complexity of the circuit arrangement is advantageously reduced and an efficiency that is improved compared to the state of the art may be achieved. Advantageously, a supply output voltage of the frequency converter approximates the supply voltage of the three-phase supply network with increasing phase currents, the phase currents thus being automatically delimited.

Advantageously, in this circuit arrangement, the intermediate circuit voltage decreases or, in the case of a feedback, increases proportionally to a load current, depending on the value of the virtual resistance according to Ohm's law. This behaviour has the advantage that when a pre-settable maximum value of the intermediate circuit voltage is reached, a load resistor that may optionally be connected may prevent a further voltage increase. Furthermore, when reaching a pre-settable maximum load current, i.e. when reaching a minimum value of the intermediate circuit voltage determined by the supply voltage, the virtual resistance and the predetermined maximum load voltage, a diode rectification without network inductance that is switched in parallel may receive the additionally-required current. A further advantage is that by means of the voltage rise in the direct voltage intermediate circuit which is now allowed, momentary peak performances may be stored in the intermediate circuit capacitor or may be taken from the same.

A particular advantage of the circuit arrangement is that several of said circuit arrangements may be switched in parallel in an unlimited manner. This allows for connecting and disconnecting individual modules during running operation, depending on demands, a particularly favourable efficiency in all performance situations resulting thereof.

A further advantage of the circuit arrangement is its robustness. Also for soft networks, it comprises no or only a small tendency to oscillate.

In a preferred embodiment of the circuit arrangement, for generating the first modulation space vector via a Park transformation, the control device is configured to transform the measured phase currents into a first current space vector using the angle of the measured phase currents, to control the angle by means of a phase-locked loop in such a way that a reactive-current component of the first current space vector vanishes, and to generate the first modulation space vector which comprises the angle and the determined modulation index as an amplitude by means of an inverse Park transformation. Advantageously, this is a simple possibility of generating the first modulation space vector having an angle that is synchronous to the supply voltage of the three-phase supply network.

In a variant of the circuit arrangement, the control device is configured to multiply the reactive-current component of the current space vector by a quotient of a determined virtual resistance and the determined modulation index to obtain an angle deviation. The control device is further configured to feed the angle deviation to the phase-locked loop. Advantageously, controlling the phase-locked loop then causes a reactive-current component of the first current space vector to always comprise a negligible value.

In an additional variant of the circuit arrangement, the control device is configured to generate a control signal for the frequency converter from a modulation space vector by means of a space vector modulation. Advantageously, the frequency converter itself may then be configured in a known manner, e.g. as IGBT inverted rectifier.

In a preferred embodiment of the circuit arrangement, the frequency converter is an IGBT inverted rectifier. IGBT inverted rectifiers are advantageously suitable for switching high performances.

The invention claimed is:
1. A method for controlling a frequency converter, wherein the method comprises the following steps:
   measuring phase currents flowing in phase conductors of a three-phase supply network;
   generating a first modulation space vector that is in phase with the phase currents and that comprises an angle that is synchronous to a supply voltage of the three-Phase supply network and that comprises a determined modulation index as an amplitude;
   conducting a Clarke transformation to transform the measured phase currents into a second current space vector;
   multiplying the second current space vector by a determined virtual resistance to obtain a second modulation space vector;
   subtracting the second modulation space vector from the first modulation space vector to obtain a third modulation space vector; and
   modulating the frequency converter according to the third modulation space vector;
   wherein generating the first modulation space vector comprises the following steps:
      conducting a Park transformation using the angle in order to transform the measured phase currents into a first current space vector;
      controlling the angle in such a way that a reactive-current component of the first current space vector takes a determined value; and
      generating the first modulation space vector that comprises the angle and the determined modulation index as an amplitude, by means of an inverse Park transformation.
2. The method according to claim 1, wherein the reactive-current component of the first current space vector is multiplied by a quotient of a determined virtual resistance and the determined modulation index to obtain an angle deviation, and to provide the angle deviation to a phase-locked loop in order to control the angle.

3. The method according to claim 1, wherein a control signal for the frequency converter is generated from the third modulation space vector by means of a space vector modulation.

4. A circuit arrangement for generating an intermediate circuit voltage from a supply voltage of a three-phase supply network, the circuit arrangement comprising:
- an intermediate circuit capacitor configured for being connected to a first phase conductor, a second phase conductor and a third phase conductor of a three-phase supply network via a frequency converter and smoothing inductors;
- a measuring device for measuring phase currents flowing in the phase conductors; and
- a control device that is provided for controlling the frequency converter;
- wherein the control device is configured to:
  - generate a first modulation space vector that is in phase with the phase currents and that comprises an angle that is synchronous to a supply voltage of the three-phase supply network and that comprises a determined modulation index as an amplitude,
  - transform the measured phase currents into a second current space vector via a Clarke transformation,
  - multiply the second current space vector by a determined virtual resistor to obtain a second modulation space vector,
  - subtract the second modulation space vector from the first modulation space vector to obtain a third modulation space vector, and
  - modulate the frequency converter according to the third modulation space vector;
- wherein the control device is configured to:
  - generate the first modulation space vector, to transform the measured phase currents into a first current space vector via a Park transformation using the angle,
  - control the angle by means of a phase-locked loop in such a way that a reactive-current component of the first current space vector takes a determined value, and
  - generate the first modulation space vector via an inverse Park transformation, the first modulation space vector comprising the angle and the determined modulation index as an amplitude.

5. The circuit arrangement according to claim 4, wherein the control device is configured to:
- multiply the reactive-current component of the first current space vector by a quotient of a determined virtual resistance and the determined modulation index to obtain an angle deviation , and
- provide the angle deviation to the phase-locked loop.

6. The circuit arrangement according to claim 4, wherein the control device is configured to generate a control signal for the frequency converter from the third modulation space vector.

7. The circuit arrangement according to claim 4, wherein the frequency converter is an IGBT inverted rectifier.

* * * * *